(12) United States Patent
Grill et al.

(10) Patent No.: US 11,446,881 B2
(45) Date of Patent: Sep. 20, 2022

(54) APPARATUS AND METHOD FOR APPLYING COVER SHEETS TO ENDS, PREFORMED INTO CROSS BOTTOMS, OF TUBE PORTIONS

(71) Applicant: STARLINGER & CO GESELLSCHAFT M.B.H., Vienna (AT)

(72) Inventors: Hannes Grill, Altenmarkt an der Triesting (AT); Markus Grabenweger, Furth an der Triesting (AT)

(73) Assignee: STARLINGER & CO GESSELSCHAFT M.B.H, Vienna (AT)

( * ) Notice: Subject to any disclaimer, the term of this patent is extended or adjusted under 35 U.S.C. 154(b) by 0 days.

(21) Appl. No.: 17/413,828

(22) PCT Filed: Nov. 28, 2019

(86) PCT No.: PCT/EP2019/082846
§ 371 (c)(1),
(2) Date: Jun. 14, 2021

(87) PCT Pub. No.: WO2020/126382
PCT Pub. Date: Jun. 25, 2020

(65) Prior Publication Data
US 2022/0024152 A1    Jan. 27, 2022

(30) Foreign Application Priority Data

Dec. 17, 2018  (EP) ..................................... 18213037

(51) Int. Cl.
*B29C 65/00* (2006.01)
*B31B 70/64* (2017.01)
(Continued)

(52) U.S. Cl.
CPC ........ *B29C 66/8511* (2013.01); *B29C 65/103* (2013.01); *B29C 65/7847* (2013.01);
(Continued)

(58) Field of Classification Search
CPC ............. B29C 66/8511; B29C 66/1122; B29C 66/3462; B29C 66/43121; B29C 66/472;
(Continued)

(56) References Cited

U.S. PATENT DOCUMENTS 4,543,138 A * 9/1985 Bollinger ................ A61J 3/072
156/69

FOREIGN PATENT DOCUMENTS

DE  102011005109 A1 * 9/2012 .......... B29C 65/103
DE  102014214593       1/2016
(Continued)

OTHER PUBLICATIONS

Machine Translation of DE-102011005109-A1 (Year: 2012).*
(Continued)

*Primary Examiner* — Daniel Mcnally
(74) *Attorney, Agent, or Firm* — Workman Nydegger

(57) ABSTRACT

A device and a method for applying cover sheets to cross-bottoms of tubular sections made of a plastic material. The device includes conveyor devices for transporting the tubular sections and for depositing the cover sheets on the cross-bottoms in a deposit area. The device includes a hot gas device with a gas heater and a nozzle connected to the gas heater and oriented toward the deposit area for the cover sheets so when gas is supplied to the gas heater, the gas flows along a flow path from the gas supply through the gas heater and the nozzle into the deposit area. The hot gas device has a hot gas reservoir with an internal volume for the temporary storage of hot gas, the flow path running through the hot gas
(Continued)

reservoir. A gas mass flow ($\dot{m}1$, $\dot{m}2$, $\dot{m}_{ges}$) of gas supplied to the gas heater is adjustable by a control.

13 Claims, 3 Drawing Sheets

(51) Int. Cl.
    *B31B 70/00*     (2017.01)
    *B31B 70/04*     (2017.01)
    *B31B 70/81*     (2017.01)
    *B29C 65/10*     (2006.01)
    *B29C 65/78*     (2006.01)
    *B31B 70/14*     (2017.01)
    *B31B 150/00*     (2017.01)
    *B31B 160/20*     (2017.01)
    *B29L 31/00*     (2006.01)

(52) U.S. Cl.
    CPC ...... *B29C 65/7894* (2013.01); *B29C 66/1122* (2013.01); *B29C 66/3462* (2013.01); *B29C 66/3472* (2013.01); *B29C 66/43121* (2013.01); *B29C 66/472* (2013.01); *B29C 66/83413* (2013.01); *B29C 66/91643* (2013.01); *B29C 66/91951* (2013.01); *B31B 70/006* (2017.08); *B31B 70/008* (2017.08); *B31B 70/04* (2017.08); *B31B 70/64* (2017.08); *B31B 70/812* (2017.08); *B29C 2793/0081* (2013.01); *B29L 2031/7129* (2013.01); *B31B 70/146* (2017.08); *B31B 2150/001* (2017.08); *B31B 2150/003* (2017.08); *B31B 2160/20* (2017.08)

(58) Field of Classification Search
    CPC ............ B29C 66/91643; B29C 65/103; B29C 65/7894; B31B 70/006; B31B 70/64; B31B 70/812; B31B 2150/001; B31B 2150/003
    See application file for complete search history.

(56) References Cited

FOREIGN PATENT DOCUMENTS

| | | |
|---|---|---|
| EP | 0953429 | 11/1999 |
| WO | 2008090056 | 7/2008 |
| WO | 2018073224 | 4/2018 |

OTHER PUBLICATIONS

International Search Report issued in International Application PCT/EP2019/082846 dated Jan. 2, 2020.
Written Opinion of ISA issued in International Application PCT/EP2019/082846 dated Jan. 2, 2021.

* cited by examiner

APPARATUS AND METHOD FOR APPLYING COVER SHEETS TO ENDS, PREFORMED INTO CROSS BOTTOMS, OF TUBE PORTIONS

The present application is a U.S. National Stage of International Application No. PCT/EP2019/082846, filed on Nov. 28, 2019, designating the United States and claiming the priority of European Patent Application No. 18213037.7 filed with the European Patent Office on Dec. 17, 2018. All of the aforementioned applications are incorporated herein in their respective entireties by this reference.

The invention relates to a device for applying cover sheets to ends of tubular sections preformed into cross-bottoms according to the preamble of claim 1 and a method for applying cover sheets to ends of tubular sections preformed into cross-bottoms according to the preamble of claim 7.

Various types of bags are used for packaging goods, especially bulk goods. Bags are generally produced from tubular sections of paper or plastic material by folding ends of the tubular sections to form bottoms. Depending on the further intended use, either both ends of a tubular section are folded to form bottoms, or only one end is folded into a bottom. To prevent the bottoms from unfolding, they are either adhesively bonded or welded together after folding. A particularly widely used bottom shape is, for example, the cross-bottom.

In case of cross-bottoms, when one end of the tubular sections is folded, a first inner triangular area, a first outer triangular area, a second inner triangular area, a second outer triangular area and a central area are formed. In the longitudinal direction of the bottom, the first inner triangular area is arranged between the first outer triangular area and the central area, and the second inner triangular area is arranged between the second outer triangular area and the central area. If both ends of a tubular section are folded into cross-bottoms, at least one cross-bottom is usually provided with a valve patch in order to facilitate the subsequent filling of the finished bag.

So that the cross-bottoms can withstand higher loads, they are additionally provided with cover sheets, with the cover sheets extending over the inner triangular areas and the central area. In case of tubular sections made of a plastic material, the cover sheets are usually welded to the cross-bottoms, since welding has turned out to be a very cost-efficient and durable connection. A hot gas means is predominantly used for welding the cover sheets together at the cross-bottoms, with the cross-bottoms being moved past said means at a constant distance. A heated gas stream generated by the hot gas means heats the respective cross-bottom just being moved past the hot gas means until its surface melts. At the same time, a cover sheet is pressed onto the cross-bottom and is thus firmly welded to the cross-bottom.

A method for welding a cover sheet onto a cross-bottom using a hot gas means is known, for example, from WO 9530598 A1.

Because of the folding, the cross-bottoms have a smaller number of fabric layers in the triangular areas than in the central area, as a result of which the central area is raised in relation to the triangular areas. This results in the disadvantage that the gas stream heats the surface of the cross-bottoms to different extents while the cross-bottoms are moved past the hot gas means, since the individual areas of the cross-bottoms exhibit different distances from the gas nozzle and the gas stream thus reaches the surface sections of the cross-bottoms in a thermally varying way. In particular, the triangular areas are heated less strongly because the distance from the surface of the cross-bottom to the gas nozzle is greatest there, resulting in poor adhesion of the cover sheet in those areas. Increasing the temperature of the gas stream is not a viable alternative, since an increased temperature of the gas stream may cause the material in the central area of the cross-bottoms to be overheated. As a result, not only would the finished bags have an unsightly appearance, but the strength of the bottom and the adhesion of the cover sheet in this area would also be reduced.

The document DE 10 2014 214593 A1 shows a device for hot air sealing of a packaging material. The device comprises two air heaters guided one behind the other. For controlling the hot gas, a valve is provided between the air heaters, by means of which hot gas that is not required can be passed once more through the air heater arranged upstream.

The document EP 0 953 429 A2 discloses a method for controlling the temperature during the hot air bonding of plastic films, wherein the temperature of the hot air is determined after the workpiece has been bonded and the temperature of the air blown in is controlled as a function of the measured temperature.

The document WO 2018/073224 A1 shows a device for sealing a cover sheet onto a tubular section. For this purpose, a hot air stream is blown in between the above-mentioned elements. For quickly controlling the temperature of the hot air stream, a cold air stream can be blown in additionally.

In document WO 2008/090056 A1, a method for the production of plastic bags is disclosed. In this case, two surfaces are heated using a heating means and then pressed. Moreover, the device used for this purpose may comprise a preheating means, in which at least one component of the bags can be preheated by means of a hot air stream.

It is the object of the present invention to avoid the disadvantages of the prior art and to provide a device and a method by means of which cover sheets can be applied to ends of tubular sections made of a plastic material, the ends having been preformed into cross-bottoms, while ensuring uniform adhesion of the cover sheets.

According to the invention, the present object is achieved by a device having the features of claim 1 and with a method having the features of claim 7. Preferred embodiments of the invention form the subject matter of the dependent claims and the specification.

The device according to the invention comprises conveying means which are designed for transporting the tubular sections in a conveying direction, the longitudinal bottom direction of the cross-bottoms being located in parallel to the conveying direction of the tubular sections. Furthermore, the conveying means are designed for conveying cover sheets in the conveying direction, depositing them on the ends of the tubular sections preformed into cross-bottoms in a deposit area when one of the cross-bottoms passes the deposit area while the tubular sections are being conveyed.

Furthermore, the device according to the invention comprises a hot gas means. The hot gas means has a gas heater for heating gas and a nozzle connected to the gas heater and oriented toward the deposit area for the cover sheets. The gas heater is connectable to a gas supply, and when gas is supplied to the gas heater, the gas flows along a flow path from the gas supply through the gas heater and the nozzle into the deposit area.

The hot gas means comprises a hot gas reservoir with an internal volume for the temporary storage of hot gas. The hot gas reservoir is either incorporated directly into the gas heater or is arranged between the gas heater and the nozzle. The flow path runs through the hot gas reservoir.

Furthermore, the device according to the invention has a control by means of which a gas mass flow of gas supplied to the gas heater is adjustable.

If gas is fed from the gas supply to the gas heater, it flows first through the gas heater. The gas heater comprises a heating element which supplies a thermal heat flow to the gas conducted through the gas heater. Depending on how high the mass flow of the gas passed through the gas heater is, the gas is heated to different extents as it flows through the gas heater, with the thermal heat flow remaining the same. With a low gas mass flow supplied to the gas heater, the gas flowing through the gas heater is heated more strongly than with a high gas mass flow. The heating element of the gas heater is preferably operated electrically or by means of a fuel gas such as methane, hydrogen, etc.

The gas flows from the gas heater into the hot gas reservoir. The hot gas reservoir constitutes a buffer storage and is charged with/passed through by gas at different temperatures depending on how high the temperature of the inflowing gas is. For example, with a low gas mass flow, the hot gas reservoir is charged with/passed through by a gas at a higher temperature than with a high gas mass flow. The hot gas reservoir is advantageously connected directly to the gas heater in order to avoid heat losses.

The gas flows from the hot gas reservoir via the nozzle into the deposit area. Advantageously, the nozzle also connects directly to the hot gas reservoir in order to avoid heat losses. The mass flow of heated gas that emerges from the nozzle corresponds (while neglecting friction) to the gas mass flow that is fed to the gas heater. If the gas mass flow is now changed abruptly, the gas mass flow emerging from the gas heater has a changed temperature. Due to the mass balance equation, the gas mass flow at the nozzle is immediately equal to the gas mass flow supplied to the gas heater upon switching after the inertia of the gas has been overcome. The gas transported with the gas mass flow displaces the gas still present in the hot gas reservoir before filling it. Thus, the temperature of the gas at the nozzle does not change immediately after the gas mass flow supplied to the gas heater has been changed, but rather the gas still present in the hot gas reservoir must first flow out of the hot gas reservoir. If, for example, the hot gas reservoir was filled with gas at a high temperature with a low gas mass flow and the gas mass flow is now increased, gas is emitted at the nozzle at an increased temperature with an increased gas mass flow, whereby a hot gas jet with a high flow rate is temporarily generated. In this way, a high heat flow is introduced into the deposit area. If the gas mass flow is now reduced again, gas is emitted at the nozzle at a low temperature with a low gas mass flow until the hot gas reservoir is emptied, whereby a gas jet that is less hot is temporarily generated with a lower flow rate. As a result, a low heat flow is introduced into the deposit area.

Thus, with an appropriate control of the gas mass flow and appropriate dimensioning of the internal volume of the hot gas reservoir, temporarily a high mass flow of heated gas with a high temperature and temporarily a low mass flow of heated gas with a low temperature can be emitted at the nozzle, although the exact same amount of heat output is always supplied to the gas mass flow in the gas heater. As a result, the device according to the invention operates in a very energy-efficient, environmentally friendly and cost-saving manner.

In order to evenly heat a cross-bottom in the inner triangular areas and the central area, according to the invention, less heat output is emitted from the nozzle than in the inner triangular areas of the cross-bottom for heating the central area to the melting temperature, since the central area of each cross-bottom is raised in relation to the inner triangular areas and the nozzle is thus closer. For this purpose, in the method according to the invention, while utilizing the hot gas reservoir:

gas is supplied to the hot gas means with an increased gas mass flow, while the first inner triangular area of a cross-bottom passes the deposit area, gas is supplied to the hot gas means with a reduced gas mass flow, while the central area of a cross-bottom passes the deposit area, and gas is supplied to the hot gas means with an increased gas mass flow, while the second inner triangular area of a cross-bottom passes the deposit area.

Due to its more even heating, the cross-bottom is evenly melted, whereby a cover sheet pressed onto the cross-bottom exhibits the same adhesion everywhere.

So that it is ensured that a high heat flow is introduced by the gas essentially in the entire first inner triangular area and/or essentially in the entire second inner triangular area and/or that a lower heat flow is introduced by the gas essentially in the entire central area, advantageously:

the mass flow of gas supplied to the hot gas means is increased shortly before the first inner triangular area of a cross-bottom reaches the deposit area;

the mass flow of gas supplied to the hot gas means is reduced as soon as the central area enters the deposit area;

the mass flow of gas supplied to the hot gas means is increased as soon as the second inner triangular area enters the deposit area;

with tubular sections transported at a distance from one another—viewed in the conveying direction—the mass flow of gas supplied to the hot gas means is reduced, while there is no first inner triangular area, second inner triangular area or central area of a cross-bottom in the deposit area; and/or the mass flow of gas supplied to the hot gas means is reduced as soon as the second inner triangular area of a cross-bottom has passed the deposit area.

The inertia of the system is compensated for in this way. It is thus prevented that insufficient heat or too much heat is supplied to parts of the surface of the cross-bottom and that those parts are insufficiently melted or overheated. Thus, uniform adhesion of the cover sheet is ensured across the entire surface of the cross-bottom.

Advantageously, the hot gas reservoir has a tubular design so that the gas can flow through it without any friction and flow losses, if possible. The tubular hot gas reservoir advantageously has essentially the same diameter as a connecting tube by means of which gas is supplied from the gas supply to the gas heater. The hot gas reservoir is advantageously sheathed with an insulating layer in order to prevent heat losses in the hot gas reservoir as far as possible.

Furthermore, a wall of the hot gas reservoir is advantageously designed in such a way that it can store heat. If the hot gas reservoir is charged, for example, with gas at a high temperature, heat is extracted from the gas and stored in the wall. If the hot gas reservoir is now charged with gas at a lower temperature, a heat transfer from the walls to the gas at a lower temperature takes place, whereby said gas is heated. As a result, a greater amount of heat can be stored in the hot gas reservoir than would result from the heat content of the hot gas stored therein.

Suitably, the gas supply is formed by a compressed air reservoir to which the device is connected. The compressed air reservoir can, for example, be part of a compressed air supply of a factory hall or workshop or may also be formed by one or several high-pressure bottles. In this embodiment, the gas mass flow of gas supplied to the gas heater is advantageously regulated via a valve, which is connected between the gas supply and the gas heater and is adjustable by the control.

The gas supply is preferably a component of the device and thus part of the device. In this embodiment, the gas supply is advantageously formed by a compressor and/or at least one compressed air reservoir. Depending on the design of the gas supply, the gas mass flow of gas supplied to the gas heater can be regulated either by a compressor output of the compressor and/or by a valve configured between the compressor and/or the at least one compressed air reservoir and the gas heater.

Preferably, an internal volume of the hot gas reservoir is selected as a function of the length of the inner triangular areas and the central area as well as the mass flows in such a way that it is ensured that the inner triangular areas are heated only with hot gas with a high mass flow—hereinafter referred to as the total mass flow—and the middle area is heated only with less hot gas with a smaller mass flow—hereinafter referred to as the basic mass flow. The total mass flow is composed of the basic mass flow plus a pulse mass flow. In this context, one volume of the pulse mass flow is advantageously one fifth to one twentieth of the internal volume of the hot gas reservoir.

The gas supply preferably has at least one compressor and/or at least one compressed air reservoir and an injector, with at least one constantly running compressor generating the basic mass flow of gas supplied to the gas heater. The injector generates the pulse mass flow by means of at least one second compressor and/or at least one compressed air reservoir, whereby the total mass flow is formed. Due to this simple design of the gas supply, the supply of gas to the gas heater can be changed very quickly and the gas supply can thus be controlled very precisely.

The conveying means for conveying the tubular sections is advantageously formed by a belt conveyor or a band conveyor, and the conveying means for conveying the cover sheets is advantageously formed by a suction cylinder.

The hot gas reservoir is suitably designed in such a way that the internal volume of the hot gas reservoir is alterable. In case of a tubular hot gas reservoir, the internal volume can be changed, for example, via sleeves with different wall thicknesses or via a varying number of sleeves. Such sleeves are advantageously formed from a material that conducts heat well, such as aluminium, brass, silver or copper. The internal volume of the hot gas reservoir is preferably selected as a function of, for example, a number of cycles during the application of the cover sheets, a bag format and/or a bag spacing between successive bags.

The gas supplied to the gas heater is advantageously air, nitrogen, carbon dioxide, or a mixture thereof.

Further advantageous embodiments of the device according to the invention and of the method according to the invention for applying cover sheets to ends of tubular sections preformed into cross-bottoms are explained in further detail below with reference to the figures.

Figure 1:
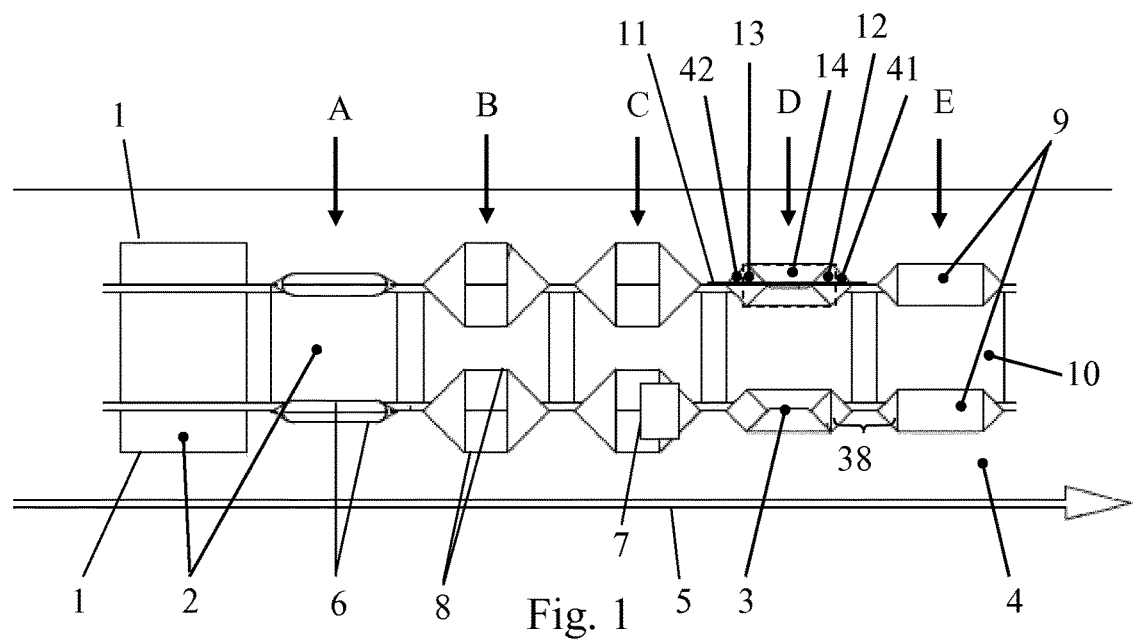
FIG. 1 shows individual processing steps for forming ends of tubular sections into cross-bottoms.

FIG. 1 shows, in a greatly simplified manner, individual processing steps A to E for forming ends 1 of tubular sections 2 into cross-bottoms 3 and applying a cover sheet 9 to the finished cross-bottoms 3. During the implementation of the processing steps A to E, the tubular sections 2 are transported on a conveyor belt 4 in the conveying direction 5 while lying flat at a distance 38 from one another, with tube layers 6 abutting one another.

In processing step A, the ends 1 of the tubular sections 2 are folded over by 90 degrees.

In processing step B, the tube layers 6 are pulled apart, whereby the ends 1 are opened. By folding down the opened ends 1, tabs 8 are formed.

In processing step C, a valve patch 7 is inserted into at least one opened end 1 that has been pulled apart and is at least partially welded or glued to the opened end 1.

In processing step D, the tabs 8 are folded over, whereby a cross-bottom 3 is formed at one end 1 in each case. As a result of folding, each cross-bottom 3 has a first inner triangular area 12, a first outer triangular area 41, a second inner triangular area 13, a second outer triangular area 42 and a central area 14, wherein, in the longitudinal bottom direction 11, the first inner triangular area 12 is arranged between the first outer triangular area 41 and the central area 14, and the second inner triangular area 13 is arranged between the second outer triangular area 42 and the central area 14. The tubular sections 2 are oriented on the conveyor belt 4 in such a way that the longitudinal bottom direction 11 of the cross-bottoms 3 is in parallel to the conveying direction 5.

Figure 2:
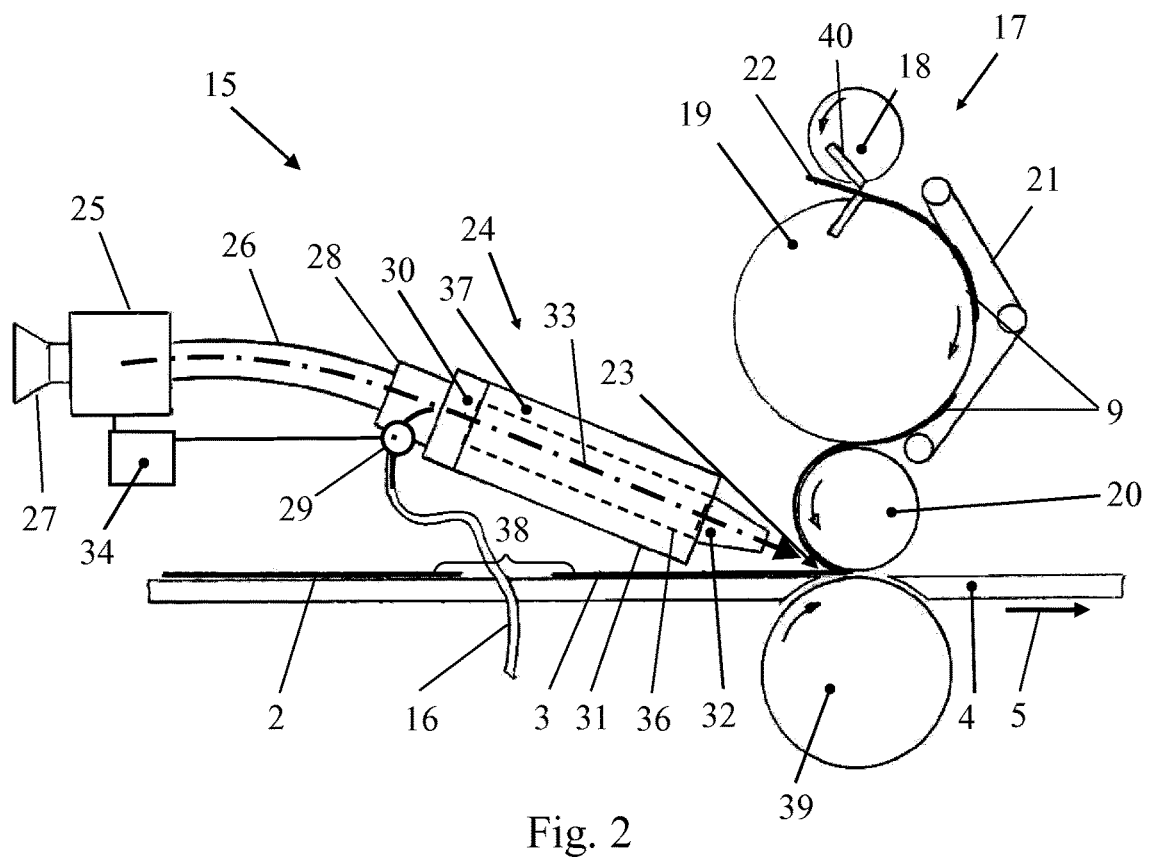
FIG. 2 shows an embodiment of a device according to the invention for applying cover sheets to the ends of tubular sections formed into cross-bottoms in a schematic view.

In processing step E, a cover sheet 9 is placed with a device 15 according to the invention as per FIG. 2 on the ends 1 of the tubular sections 2 preformed into cross-bottoms 3 and is welded thereto. The device 15 according to the invention is not illustrated in FIG. 1 for reasons of clarity. The bag 10 completed by processing step E can now be filled with material. Processing devices for performing the processing steps A to D are sufficiently well known and are therefore not explained in further detail.

It should also be pointed out that a cross-bottom 3 may also be formed only at one end 1 of the tubular sections 2, if the bag is to be used as a sachet, for example.

FIG. 2 shows an embodiment of a device 15 according to the invention in a schematic view. The device 15 comprises conveying means for transporting the tubular sections 2 and the cover sheets 9. The conveying means for transporting the tubular sections 2 is formed by the conveyor belt 4, which transports the tubular sections 2 according to FIG. 1 past all the stations for processing steps A to E. However, the conveying means for transporting the tubular sections 2 may also be formed by an independent conveyor belt, wherein the processing steps A to E are carried out at stations on at least one separate conveyor belt.

The conveying means for transporting the cover sheets 9 is formed by a conveying device 17. The conveying device 17 comprises a cutting cylinder 18, a transfer cylinder 19, a suction cylinder 20 and a conveying path 21. The cover sheets 9 are cut from an endless band 22 by means of blades 40 arranged on the cutting cylinder 18 and the transfer cylinder 19 and are supplied across the transfer cylinder 19 and the conveying path 21 to the suction cylinder 20. The suction cylinder 20 always places one cover sheet 9 on a cross-bottom 3 in a deposit area 23, while the tubular sections 2 are conveyed in the conveying direction 5 and pass the deposit area 23. The speed of the tubular sections 2 and the cover sheets 9 is identical when they are placed, with both the cover sheets 9 and the tubular sections 2 being transported in the conveying direction 5 when they are placed. The depositing of the cover sheets 9 on the cross-bottoms 3 takes place starting at the first inner triangular area 12 and continues over the middle area 14 and the second inner triangular area 13, whereby a gap is created in the deposit area 23 between the cover sheet 9 and the cross-bottoms 3 as a result of successive depositing.

The device 15 according to the invention also comprises a hot gas means 24. The hot gas means 24 is connected to a gas supply. The gas supply is formed by a compressor in the form of a fan 25, a compressed air distributor 28 and an injector 29. The fan 25 connects to the compressed air distributor 28 via a connecting tube 26. The injector 29 connects directly to the compressed air distributor 28. The compressed air distributor 28 connects to the hot gas means 24. Via a tube 16, the injector 29 is connected to an external compressed air supply, which is not illustrated any further. The fan 25 comprises an intake funnel 27. The fan 25 and the injector 29 can be part of the device 15, or may also be designed separately. There is also the possibility that the gas supply is formed by a compressor, a fan and/or a compressed air reservoir.

The hot gas means 24 comprises a gas heater 30, a hot gas reservoir 31 and a nozzle 32, which is directed into the deposit area 23 for the cover sheets 9. The hot gas reservoir 31 connects directly to the gas heater 30, and the nozzle 32 connects directly to the hot gas reservoir 31.

If a gas mass flow is now supplied by the gas supply to the hot gas means 24, gas will flow along a flow path 33 from the gas supply through the gas heater 30, the hot gas reservoir 31 and the nozzle 32 into the deposit area 23.

The hot gas reservoir 31 has an internal volume 36 and a tubular design. A diameter of the tubular internal volume 36 is essentially equal to an inner diameter of the connecting tube 26. The inner volume 36 is sheathed with an insulating layer 37 in order to keep heat losses as low as possible.

The device 15 according to the invention comprises a control 34. The control 34 is connected to the fan 25 and the injector 29 for communication. The gas mass flow of gas supplied to the hot gas means 24 is adjustable by means of the control 34.

Figure 3:
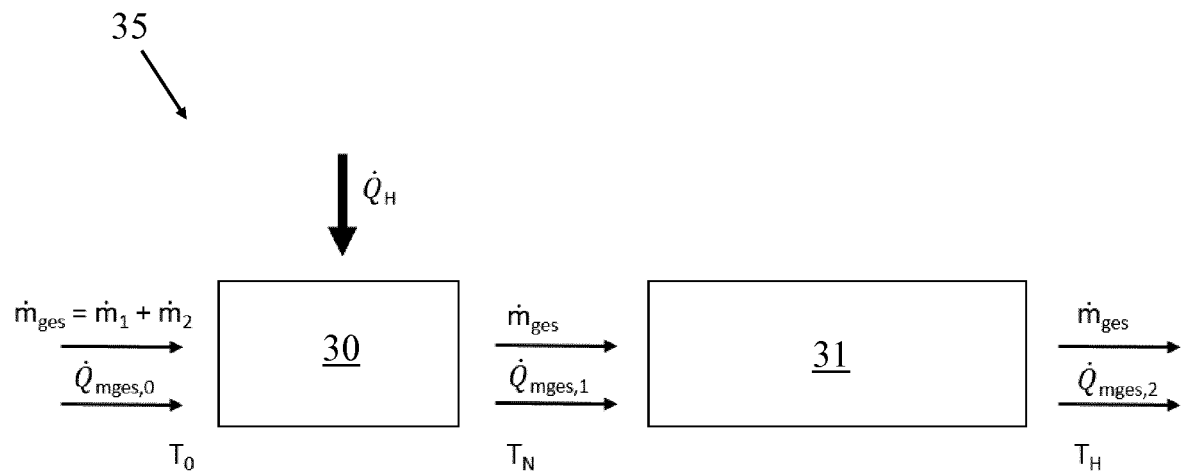
FIGS. 3 and 4 show a hot gas means of the device according to the invention as a simplified system.
Figure 4:
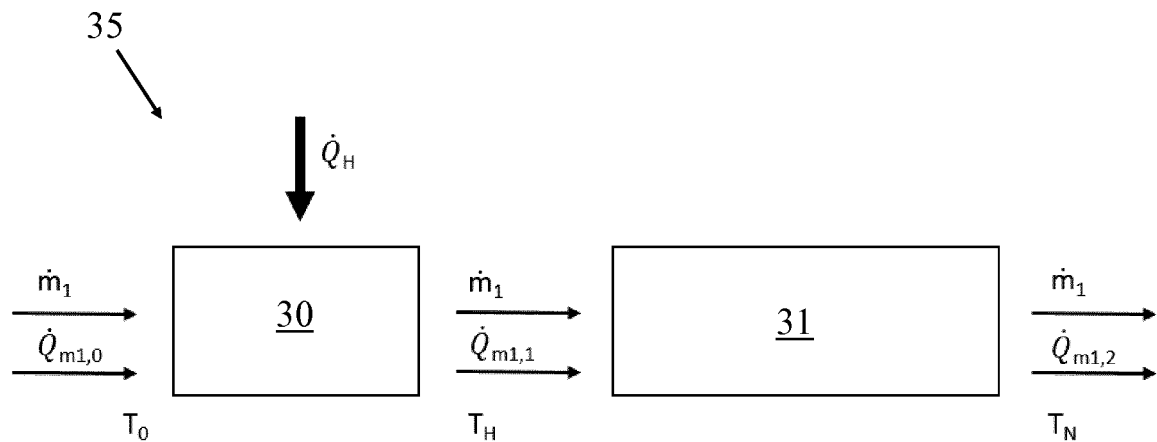

FIGS. 3 and 4 show the hot gas means 24 of the device 15 according to the invention as a simplified system 35.

Figure 5:
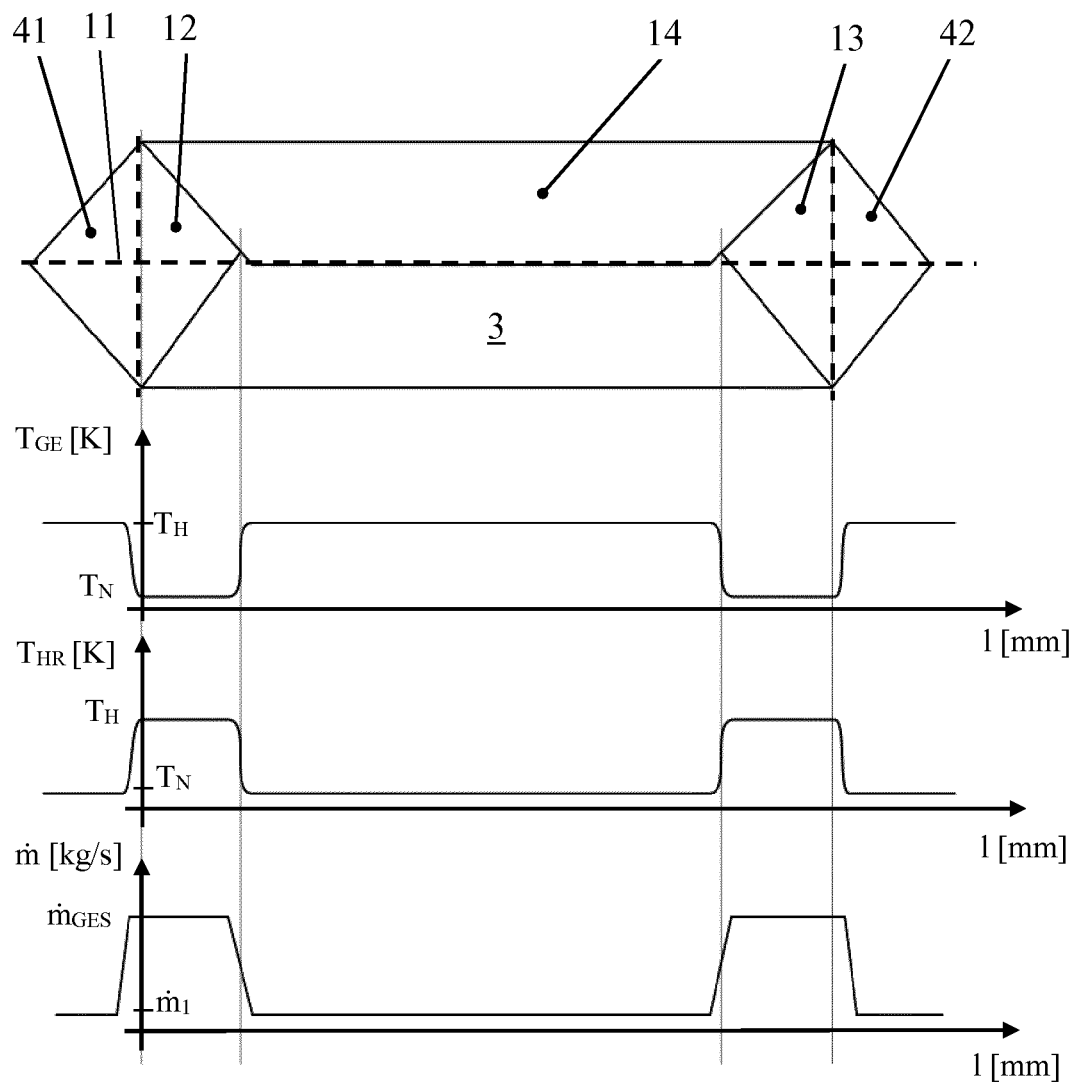
FIG. 5 shows a chart of the temperatures prevailing in the simplified system according to FIGS. 3 and 4 as a function of a gas mass flow supplied to the hot gas means.

FIG. 5 shows a chart of the temperatures prevailing in the simplified system 35 according to FIGS. 3 and 4 as a function of a gas mass flow supplied to the hot gas means 24.

The function of the device 15 according to the invention will now be explained in further detail with reference to FIGS. 3 to 5. For this purpose, the gas mass flow of gas supplied to the hot gas means is viewed more closely while a cross-bottom 3 passes the deposit area 23.

As soon as the first inner triangular area 12 of a cross-bottom 3 enters the deposit area 23, the gas mass flow emitted from the nozzle 32 hits the first inner triangular area 12. Shortly before the first inner triangular area 12 reaches the deposit area 23, i.e., shortly before the gas mass flow that is emitted from the nozzle 32 no longer hits the conveyor belt 4 or, respectively, the first outer triangular area 41 at the distance 38, but rather hits the first inner triangular area 12, the gas mass flow supplied to the hot gas means 24 is increased from a basic mass flow $\dot{m}_1$ to a total mass flow $\dot{m}_{ges}$. See FIG. 5.

The hot gas reservoir 31 is charged with gas at a temperature $T_H$—referred to below as a hot charge gas.

The total mass flow $\dot{m}_{ges}$ is composed of the basic mass flow $\dot{m}_1$ and a pulse mass flow $\dot{m}_2$. The basic mass flow $\dot{m}_1$ is produced by the fan 25, and the pulse mass flow $\dot{m}_2$ is produced via the injector 29. In this regard, see in particular also FIG. 3.

Since the mass balance across the entire system 35 must be zero, the mass flow through the hot gas means 24 is constant and corresponds to the total mass flow $\dot{m}_{ges}$. This means that the mass flow of the gas which emerges from the hot gas reservoir 31 at the nozzle 32 is equal to the mass flow of the gas which is supplied to the hot gas means 24.

A heat $\dot{Q}_{mges,0}$ is supplied to the gas heater via the gas supplied to the gas heater 30 via the total mass flow $\dot{m}_{ges}$. This is calculated from the basic mass flow $\dot{m}_1$ and the pulse mass flow $\dot{m}_2$, the specific heat capacity of the gas and the temperature $T_0$ of the basic mass flow $\dot{m}_1$ and the pulse mass flow $\dot{m}_2$.

In the gas heater 30, a thermal heat flow $\dot{Q}_H$ is supplied via a heating element, which is not illustrated. As a result, the temperature of the total mass flow $\dot{m}_{ges}$ is raised from $T_0$ to $T_N$ and a heat flow $\dot{Q}_{mges,1}$ is transferred with the gas into the hot gas reservoir 31. The temperature $T_{GE}$ at the outlet of the gas heater 30 is equal to $T_N$. See FIG. 5.

The gas fed into the hot gas reservoir 31 at the temperature $T_N$ displaces the hot charge gas from the hot gas reservoir 31 via the nozzle 32 and fills the hot gas reservoir 31 with gas at the temperature $T_N$—referred to below as a cold charge gas. The temperature $T_{HR}$ of the hot charge gas discharged at the hot gas reservoir 31 or, respectively, the nozzle 32 is equal to $T_H$. The hot charge gas introduces a heat flow $\dot{Q}_{mges,2}$ into the deposit area 23. This is calculated from the total mass flow $\dot{m}_{ges}$, the specific heat capacity of the gas and the temperature $T_H$ of the hot charge gas.

At the moment when the central area 14 of the cross-bottom 3 enters the deposit area 23, the gas mass flow supplied to the hot gas means 24 is reduced from the total mass flow $\dot{m}_{ges}$ by the pulse mass flow $\dot{m}_2$ to the basic mass flow $m_1$. For this purpose, the injector 30 is switched off by the control 34.

The total mass flow $\dot{m}_{ges}$ and the internal volume 36 are coordinated such that the hot gas reservoir 31 is filled with the cold charge gas, but no cold charge gas leaves the hot gas reservoir 31, while the gas mass flow supplied to the hot gas means 24 corresponds to the total mass flow $\dot{m}_{ges}$. Correspondingly, the hot gas reservoir 31 is filled with cold charge gas during the switching from the total mass flow $\dot{m}_{ges}$ to the basic mass flow $\dot{m}_1$.

Due to the mass balance in the entire system 35, the mass flow corresponds to the basic mass flow $\dot{m}_1$ after switching to the basic mass flow $m_1$. A heat flow $\dot{Q}_{m1,0}$ is supplied to the gas heater 30 via the gas supplied to the gas heater 30 via the basic mass flow $m_1$. This is calculated from the basic mass flow $\dot{m}_1$, the specific heat capacity of the gas and the temperature $T_0$ of the basic mass flow $m_1$ See in particular FIG. 4.

In the gas heater 30, the thermal heat flow $\dot{Q}_H$ is supplied via the heating element. The thermal heat flow $\dot{Q}_H$ is constant. As a result, the temperature of the basic mass flow $\dot{m}_1$ is raised from $T_0$ to $T_H$, and a heat flow $\dot{Q}_{m1,1}$ is transferred with the gas into the hot gas reservoir 31. The temperature $T_{GE}$ at the outlet of the gas heater 30 is equal to $T_H$, wherein the following applies due to the lower mass flow supplied and the constant thermal heat flow $\dot{Q}_H$: $T_H > T_N$.

The gas fed into the hot gas reservoir 31 at the temperature $T_H$ displaces the cold charge gas from the hot gas reservoir 31 via the nozzle 32 and fills the hot gas reservoir 31 with hot charge gas at the temperature $T_H$. The temperature $T_{HR}$ of the cold charge gas discharged at the hot gas reservoir 31 or, respectively, the nozzle 32 is equal to $T_N$. The cold charge gas introduces a heat flow $\dot{Q}_{m1,2}$ into the deposit area 23. This is calculated from the basic mass flow $\dot{m}_1$, the specific heat capacity of the gas and the temperature $T_N$ of the cold charge gas.

At the moment when the second inner triangular area 13 of the cross-bottom 3 enters the deposit area 23, the gas mass flow supplied to the hot gas means 24 is increased from the basic mass flow $\dot{m}_1$ by the pulse mass flow $\dot{m}_2$ to the total mass flow $\dot{m}_{ges}$. For this purpose, the injector 30 is simply switched on again by the control 34. The total mass flow $\dot{m}_{ges}$ and the internal volume 36 are coordinated such the hot gas reservoir 31 is filled with the hot charge gas, but no hot charge gas leaves the hot gas reservoir 31, while the gas mass flow supplied to the hot gas means 24 corresponds to the basic mass flow $\dot{m}_1$ Correspondingly, the hot gas reservoir 31 is filled with hot charge gas during the switching from the basic mass flow $\dot{m}_1$ to the total mass flow $\dot{m}_{ges}$. The process is now repeated in exactly the same way as with the first inner triangular area 12. Gas with the temperature $T_H$ is discharged from the nozzle 32 or, respectively, the hot gas reservoir 31, and the hot gas reservoir 31 is filled with cold charge gas.

When the second inner triangular area 13 leaves the deposit area 23, the gas mass flow supplied to the gas heater 30 is again reduced from the total mass flow $\dot{m}_{ges}$ to the basic mass flow $\dot{m}_1$, and the hot gas reservoir 31 is charged with hot charge gas, and gas with the temperature $T_N$ is displaced from the hot gas reservoir 31. Correspondingly, gas with the low temperature $T_N$ and the basic mass flow $\dot{m}_1$ leaves the nozzle 32 and gets into the deposit area 23, when the outer triangular areas 41 and 42 are located in the deposit area 23 and when the gas hits the conveyor belt 4 at a distance 38 or, respectively, as soon as the second inner triangular area 13 has passed the deposit area 23.

The gas with the low temperature $T_N$ and the basic mass flow $\dot{m}_1$ is advantageously deviated away from the deposit area 23 and into an environment by a deflecting means, which is not illustrated, for example a rotary valve or a baffle, if the outer triangular areas 41 and 42 are located in the deposit area 23 and the gas would hit the conveyor belt 4 at a distance 38. In this way, it is prevented that heat is introduced into the outer triangular areas 41 and 42, which might cause damage to the fabric.

If a further inner first triangular area 12 of a subsequent cross-bottom 3 reaches the deposit area 23, the above-described process will restart from the beginning.

Since the central area 14 is raised in relation to the inner triangular areas 12 and 13, the central area 14 is arranged closer to the nozzle 32 than the inner triangular areas 12 and 13. Due to the increased temperature $T_H$ and the increased mass flow $\dot{m}_{ges}$ with which the gas is emitted from the nozzle 32 into the inner triangular areas 12 and 13, the same amount of heat is introduced into the inner triangular areas 12 and 13 as into the central area 14, whereby a surface of the cross-bottom 3 is evenly heated and melted.

While a cover sheet 9 is placed on a cross-bottom 3 and heat is introduced into the deposit area 23 via the gas mass flow, the cover sheet 9 is pressed onto the cross-bottom 3 by means of a press cylinder 39, whereby the cross-bottom 3 is welded to the cover sheet 9.

As a result of the uniform heating of the surface of the cross-bottom 3, uniform adhesion of the cover sheets 9 to the cross-bottoms 3 can be achieved. By the hot gas reservoir 31 and the controlled supply of gas to the hot gas means 24, which occurs according to the invention, the thermal heat flow $\dot{Q}_H$ can be kept constant, and it is prevented that hot gas has to be released into the environment in an unused state so as to evenly heat the surface of the cross-bottom 3.

The invention claimed is:

1. A device for applying cover sheets to ends of tubular sections made of a plastic material, the ends having been preformed into cross-bottoms, comprising:
   a conveyor operable to transport the tubular sections and to transport and deposit the cover sheets on the cross-bottoms of the tubular sections in a deposit area while the tubular sections are being conveyed, and
   a hot gas device with a gas heater operable to heat gas, and a nozzle connected to the gas heater and oriented toward the deposit area for the cover sheets, wherein the gas heater is connectable to a gas supply and, when gas is supplied to the gas heater, the gas flows along a flow path from the gas supply through the gas heater and the nozzle into the deposit area,
   wherein the hot gas device further comprises a hot gas reservoir with an internal volume for the temporary storage of hot gas wherein the hot gas reservoir is located between the nozzle and the gas heater, and the flow path running through the hot gas reservoir, and
   wherein a gas mass flow ($\dot{m}_1$, $\dot{m}_2$, $\dot{m}_{ges}$) of gas supplied to the gas heater is adjustable by a control, wherein the control is operable to temporarily increase the gas mass flow ($\dot{m}_1$, $\dot{m}_2$, $\dot{m}_{ges}$) of gas supplied to the gas heater from a basic mass flow ($\dot{m}_1$) by a pulse mass flow ($\dot{m}_2$) to a total mass flow ($\dot{m}_{ges}$).

2. The device according to claim 1, wherein one volume of the pulse mass flow ($\dot{m}_2$) is one fifth to one twentieth of the internal volume of the hot gas reservoir.

3. The device according to claim 2, wherein the gas supply comprises at least one compressor and/or at least one compressed air reservoir and an injector, wherein at least one constantly running compressor is operable to generate the basic mass flow ($\dot{m}_1$) of gas supplied to the gas heater and the injector is operable to generate the pulse mass flow ($\dot{m}_2$) by at least one second compressor and/or at least one compressed air reservoir, as is operable to supply the pulse mass flow ($\dot{m}_2$) to the basic mass flow ($\dot{m}_1$), to generate the total mass flow ($\dot{m}_{ges}$).

4. The device according to claim 1, wherein the hot gas reservoir has a tubular configuration.

5. The device according to claim 1, wherein the gas supply is a component of the device operable to apply cover sheets to ends of tubular sections made of a plastic material, the ends having been preformed into cross-bottoms, and the gas supply comprises at least one compressor and/or at least one compressed air reservoir.

6. The device according to claim 1, wherein the conveyor comprises a belt conveyor or a band conveyor operable to transport the tubular sections, and the conveyor further comprises a suction cylinder operable to transport the cover sheets.

7. The device according to claim 1, wherein a size of the internal volume of the hot gas reservoir is adjustable.

8. A method for applying cover sheets to ends of tubular sections made of a plastic material, the ends having been preformed into cross-bottoms, wherein the ends preformed into cross-bottoms each have a first outer triangular area, a first inner triangular area, a second outer triangular area, a second inner triangular area and a central area, wherein, in a longitudinal bottom direction, the first inner triangular area is arranged between the first outer triangular area and the central area, and the second inner triangular area is arranged between the second outer triangular area and the central area, the method comprising operations of:

a) transporting the tubular sections in a conveying direction, the longitudinal bottom direction of the cross-bottoms being in parallel to the conveying direction;

b) transporting the cover sheets in the conveying direction;

c) while the tubular sections are being conveyed, always placing one cover sheet on a cross-bottom in a deposit area, when one of the cross-bottoms passes the deposit area, wherein the method furthermore comprises supplying a gas with a mass flow ($\dot{m}_{ges}$) to a hot gas device while the cover sheet is being applied, the hot gas device comprising a gas heater, a hot gas reservoir and a nozzle which configured to direct heated gas into the deposit area, and wherein:

the gas is supplied to the hot gas device with an increased mass flow ($\dot{m}_{ges}$), while the first inner triangular area of a cross-bottom passes the deposit area;

the gas is supplied to the hot gas device with a reduced mass flow ($\dot{m}_1$), while the central area of a cross-bottom passes the deposit area; and the gas is supplied to the hot gas device with an increased mass flow ($\dot{m}_{ges}$), while the second inner triangular area of a cross-bottom passes the deposit area.

9. The method according to claim 8, wherein the tubular sections are transported at a distance from one another — viewed in the conveying direction — wherein the increased mass flow ($\dot{m}_{ges}$) of gas supplied to the hot gas device is reduced, while there is no first inner triangular area, second inner triangular area or central area of a cross-bottom in the deposit area.

10. The method according to claim 9, wherein the increased mass flow ($\dot{m}_{ges}$) of gas supplied to the hot gas device is reduced as soon as the second inner triangular area of a cross-bottom has passed the deposit area.

11. The method according to claim 8, wherein the reduced mass flow ($\dot{m}_1$) of gas supplied to the hot gas device is increased shortly before the first inner triangular area of the cross-bottom reaches the deposit area.

12. The method according to claim 8, wherein the increased mass flow ($\dot{m}_{ges}$) of gas supplied to the hot gas device is reduced as soon as the central area enters the deposit area.

13. The method according to claim 8, wherein the reduced mass flow ($\dot{m}_1$) of gas supplied to the hot gas device is increased as soon as the second inner triangular area enters the deposit area.

* * * * *